United States Patent
White et al.

(12)

(10) Patent No.: US 6,438,559 B1
(45) Date of Patent: Aug. 20, 2002

(54) SYSTEM AND METHOD FOR IMPROVED SERIALIZATION OF JAVA OBJECTS

(75) Inventors: Shannon Ralph Normand White; James D. Graham, both of Waterloo (CA)

(73) Assignee: Sybase, Inc., Dublin, CA (US)

( * ) Notice: Subject to any disclaimer, the term of this patent is extended or adjusted under 35 U.S.C. 154(b) by 0 days.

(21) Appl. No.: 09/327,210

(22) Filed: Jun. 7, 1999

Related U.S. Application Data

(60) Provisional application No. 60/127,653, filed on Apr. 2, 1999.

(51) Int. Cl.$^7$ .............................................. G06F 17/30
(52) U.S. Cl. ......................................... 707/103; 707/10
(58) Field of Search ............................. 707/4, 10, 102, 707/103, 202, 100, 101, 1; 709/203, 231, 232, 223, 247, 330, 316, 201; 717/247, 5, 6; 715/5

(56) References Cited

U.S. PATENT DOCUMENTS

| | | | |
|---|---|---|---|
| 4,249,241 A | | 2/1981 | Aberle et al. ................ 710/200 |
| 4,809,168 A | | 2/1989 | Hennessy et al. ........... 709/104 |
| 5,944,781 A | | 8/1999 | Murray ........................ 709/202 |
| 6,066,181 A | * | 5/2000 | DeMaster ....................... 707/5 |
| 6,233,582 B1 | * | 5/2001 | Traversat et al. ........... 707/102 |
| 6,266,666 B1 | * | 7/2001 | Ireland et al. ................ 707/10 |
| 6,275,847 B1 | * | 8/2001 | Robinson .................... 709/201 |

OTHER PUBLICATIONS

Dreystadt, J., "Storing Java in a Relational Database," BYTE, Jun. 1998, pp. 61–62.

* cited by examiner

*Primary Examiner*—Diane D. Mizrahi
(74) *Attorney, Agent, or Firm*—John A. Smart

(57) ABSTRACT

A distributed (e.g., client/server) computing environment is described which implements protocol methodology improving the streaming of objects, such as for distributed applications. In particular, the methodology facilitates streaming of objects (e.g., Java objects) stored and managed remotely (e.g., objects stored and managed in relational databases) to clients in a highly efficient manner. The methodology may be implemented by extending an existing streaming methodology or protocol to include a class identifier approach for supporting object serialization. A Class ID (ACI) serialization is provided as a protocol for converting between a java object and a binary representation. ACI is intended for an environment in which all classes ever involved in any serialization are known by the environment (as is often the case). Each class known to the environment is represented by a compact numeric identifier, and it is this identifier alone that is used to represent the class description in the serialization. A table of the class identifiers is kept at the beginning of each serialization. A simple transformation is applied to achieve portability, so that any ACI serialization can be converted to a portable serialization, a Class Descriptor serialization (ACD). The ACD is identical to ACI except that the class identifier table beginning ACI is replaced by a table of class descriptors. These class descriptors contain virtually the same information as standard (e.g., Sun) class descriptors, so an ACD serialization has the same portability characteristics as Sun serialization. In this manner, the present invention provides the ability to create and stream objects, particularly Java objects, in a manner which does not incur a substantial size or resource penalty.

18 Claims, 6 Drawing Sheets

SYSTEM AND METHOD FOR IMPROVED SERIALIZATION OF JAVA OBJECTS

RELATED APPLICATIONS

The present application claims the benefit of priority from and is related to the following commonly-owned U.S. application: application Ser. No. 60/127,653, entitled System and Method for Improved Serializarion of Java Objects, filed Apr. 2, 1999. The present application is also related to the following commonly-owned U.S. application: application Ser. No. 09/233,365, entitled System and Method for Serializing Java Objects in a Tabular Data Stream, filed Jan. 19, 1999 and now U.S. Pat. No. 6,356,946. The disclosures of the foregoing applications are hereby incorporated by reference in their entirety, including any appendices or attachments thereof, for all purposes.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to data access and processing in a distributed computing system and, more particularly, to a system implementing methodology for improving data streaming of objects in distributed computer environments.

Computers are very powerful tools for storing and providing access to vast amounts of information. Computer databases are a common mechanism for storing information on computer systems while providing easy access to users. A typical database is an organized collection of related information stored as "records" having "fields" of information. As an example, a database of employees may have a record for each employee where each record contains fields designating specifics about the employee, such as name, home address, salary, and the like.

Between the actual physical database itself (i.e., the data actually stored on a storage device) and the users of the system, a database management system or DBMS is typically provided as a software cushion or layer. In essence, the DBMS shields the database user from knowing or even caring about underlying hardware-level details. Typically, all requests from users for access to the data are processed by the DBMS. For example, information may be added or removed from data files, information retrieved from or updated in such files, and so forth, all without user knowledge of underlying system implementation. In this manner, the DBMS provides users with a conceptual view of the database that is removed from the hardware level. The general construction and operation of a database management system is known in the art. See e.g., Date, C., *An Introduction to Database Systems*, Volume I and II, Addison Wesley, 1990; the disclosure of which is hereby incorporated by reference.

DBMS systems have long since moved from a centralized mainframe environment to a de-centralized or distributed environment. One or more PC "client" systems, for instance, may be connected via a network to one or more server-based database systems (SQL database server). Well-known examples of computer networks include local-area networks (LANs) where the computers are geographically close together (e.g., in the same building), and wide-area networks (WANs) where the computers are farther apart and are connected by telephone lines or radio waves.

Often, networks are configured as "client/server" networks, such that each computer on the network is either a "client" or a "server." Servers are powerful computers or processes dedicated to managing shared resources, such as storage (i.e., disk drives), printers, modems, or the like. Servers are often dedicated, meaning that they perform no other tasks besides their server tasks. For instance, a database server is a computer system that manages database information, including processing database queries from various clients. The client part of this client-server architecture typically comprises PCs or workstations which rely on a server to perform some operations. Typically, a client runs a "client application" that relies on a server to perform some operations, such as returning particular database information. Often, client-server architecture is thought of as a "two-tier architecture," one in which the user interface runs on the client or "front end" and the database is stored on the server or "back end" The actual business rules or application logic driving operation of the application can run on either the client or the server (or even be partitioned between the two). In a typical deployment of such a system, a client application, such as one created by an information service (IS) shop, resides on all of the client or end-user machines. Such client applications interact with host database engines (e.g., Sybase® Adaptive Server™), executing business logic which traditionally ran at the client machines.

More recently, the development model has shifted from standard client/server or two-tier development to a three-tier (or n-tier), component-based development model. This newer client/server architecture introduces three well-defined and separate processes, each typically running on a different platform. A "first tier" provides the user interface, which runs on the user's computer (i.e., the client). Next, a "second tier" provides the functional modules that actually process data. This middle tier typically runs on a server, often called an "application server." A "third tier" furnishes a database management system (DBMS) that stores the data required by the middle tier. This tier may run on a second server called the database server.

The three-tier design has many advantages over traditional two-tier or single-tier designs. For example, the added modularity makes it easier to modify or replace one tier without affecting the other tiers. Separating the application functions from the database functions makes it easier to implement load balancing. Thus, by partitioning applications cleanly into presentation, application logic, and data sections, the result will be enhanced scalability, reusability, security, and manageability.

In a typical client/server environment, the client knows about the database directly and can submit a database query for retrieving a result set which is generally returned as a tabular data set. In a three-tier environment, particularly a component-based one, the client never communicates directly with the database. Instead, the client typically communicates through one or more components. Components themselves are defined using one or more interfaces, where each interface is a collection of methods. In general, components return information via output parameters. In the conventional, standard client/server development model, in contrast, information is often returned from databases in the form of tabular result sets, via a database interface such as Open Database Connectivity (i.e., ODBC, available from Microsoft Corp. of Redmond, Washington) or Java Database Connectivity (i.e., JDBC, available from Sun Microsystems of Mountain View, Calif.). A typical three-tier environment would, for example, include a middle tier comprising business objects implementing business rules (logic) for a particular organization. The business objects, not the client, communicates with the database.

For their part, application writers or developers like to write object-oriented programs using modern object-oriented programming techniques. At the same time, however, these developers prefer to have their data (i.e., the data employed by the application) stored in a database having relational tables, as that is an easy way of storing and retrieving data. A particular problem arises when one wants to retrieve data from the database for use (e.g., manipulation) within one's program: how is this "flat" data converted into objects. In this regard, "object" refers to the specific programming construct that defines associated data members and methods (typically, including data hiding and containment), such as an object instantiated from a C++ class, a Java class, an Object Pascal class, or the like.

One of the advantages of Java as an object-oriented language over C++ is in Java's ability to flatten objects into a standard binary representation. This ability to flatten objects allows the persisting of objects in files or databases, or transmission of objects between applications across a network. Because the representation is standard, applications written by different vendors can exchange objects without having to revert to a proprietary protocol. This standard representation was developed by Sun Microsystems and will be referred to herein as Sun serialization.

Sun serialization is a protocol for converting between a Java object and its binary representation. The binary representation is an array of bytes coded to represent the Java object using the Sun serialization protocol. How the Java object is represented within its particular host virtual runtime environment (virtual machine or VM) is irrelevant to its binary encoding. A Java object itself is a collection of data fields whose values are interpreted by a Java class. The Java class of an object may specify one or more named typed fields, whose values are contained in the object. Java classes can be "subclassed," meaning other classes can inherit the named typed fields of a particular class, and provide additional named typed fields.

When an object is serialized using Sun serialization, a description of the object's class is serialized along with it. The class description is the template that allows the object to be reconstructed. Such a template allows a meaningful interpretation of the object's data, without which the data would just be a stream of bytes. The class description includes details of the class field names and types. With this information, another goal is achieved: the description acts as versioning information. Classes can be modified over time as the development process dictates, and an object serialized under an earlier version of a particular class must be able to "deserialized" as a newer version of the class. This would, in general, be impossible without the serialization's inclusion of class field names and types. When deserialization takes place the old class description can be compared to the newer description and fields can be mapped as needed.

The inclusion of the detailed class description in the object serialization makes those serializations portable and "versionable." Unfortunately, however, this is done today at the expense of sometimes considerable size required to represent the descriptions. A time penalty also results, from the time taken to write the description. Accordingly, a better solution is sought.

What is desired is a solution providing the ability to create and stream objects, particularly Java objects, in a manner which does not incur a considerable size or resource penalty. Moreover, such a solution should preserve portability. The present invention fulfills this and other needs.

SUMMARY OF THE INVENTION

A distributed (e.g., client/server) computing environment is described which, in accordance with the present invention, simplifies the use of objects in distributed applications or other instances where transfer of objects is required. In particular, the invention provides an improved methodology for streaming objects (e.g., Java objects) stored and managed remotely (e.g., objects stored and managed in relational databases) to clients in a highly efficient manner. Once at the clients, the objects may be executed or otherwise manipulated locally as desired.

The present invention may be implemented by extending an existing streaming methodology or protocol, such as Sybase Tabular Data Stream (TDS) protocol or other comparable streaming protocol. Streaming is modified to include a class identifier approach of the present invention for supporting object serialization. A Class ID (referred hereafter as ACI) serialization is provided as a protocol for converting between a java object and a binary representation. Like Sun serialization, it operates to provide object serialization. Unlike Sun serialization, however, the class description required in ACI is dramatically less, thereby minimizing the time penalty and storage requirements usually required to represent class description information in a stream.

ACI is intended for an environment in which all classes ever involved in any serialization are known by the environment (as is often the case). Each class known to the environment is represented by a compact numeric identifier, and it is this identifier alone that is used to represent the class description in the serialization. A table of the class identifiers is kept at the beginning of each serialization. ACI is much smaller but, without further enhancement, the approach would be at the expense of portability. In accordance with the present invention, however, a simple transformation is applied so that any ACI serialization can be converted to a portable serialization.

Class Descriptor serialization (ACD) is also provided for achieving portability. The ACD is identical to ACI except that the class identifier table beginning ACI is replaced by a table of class descriptors. These class descriptors contain virtually the same information as Sun class descriptors, so an ACD serialization has the same portability characteristics as Sun serialization. To convert between ACI and ACD serializations is a very simple and computationally frugal process. Because both are otherwise identical (apart from the class identifier tables), only the class table contents need change. The environment maintains a correspondence between the ACI class identifiers and ACD class descriptors. In this manner, the present invention provides the ability to create and stream objects, particularly Java objects, in a manner which does not incur a substantial size or resource penalty.

DETAILED DESCRIPTION OF A PREFERRED EMBODIMENT

The following description will focus on the presently-preferred embodiment of the present invention, which is operative in a distributed computing environment executing application programs which interact with remote data, such as that which is stored on an SQL database server. The present invention, however, is not limited to any particular application or environment. Instead, those skilled in the art will find that the present invention may be advantageously applied to any application or environment where optimization of object data access and processing is desirable, including non-SQL database management systems and the like. The following description is, therefore, for the purpose of illustration and not limitation.

Standalone System Hardware

Figure 1A:
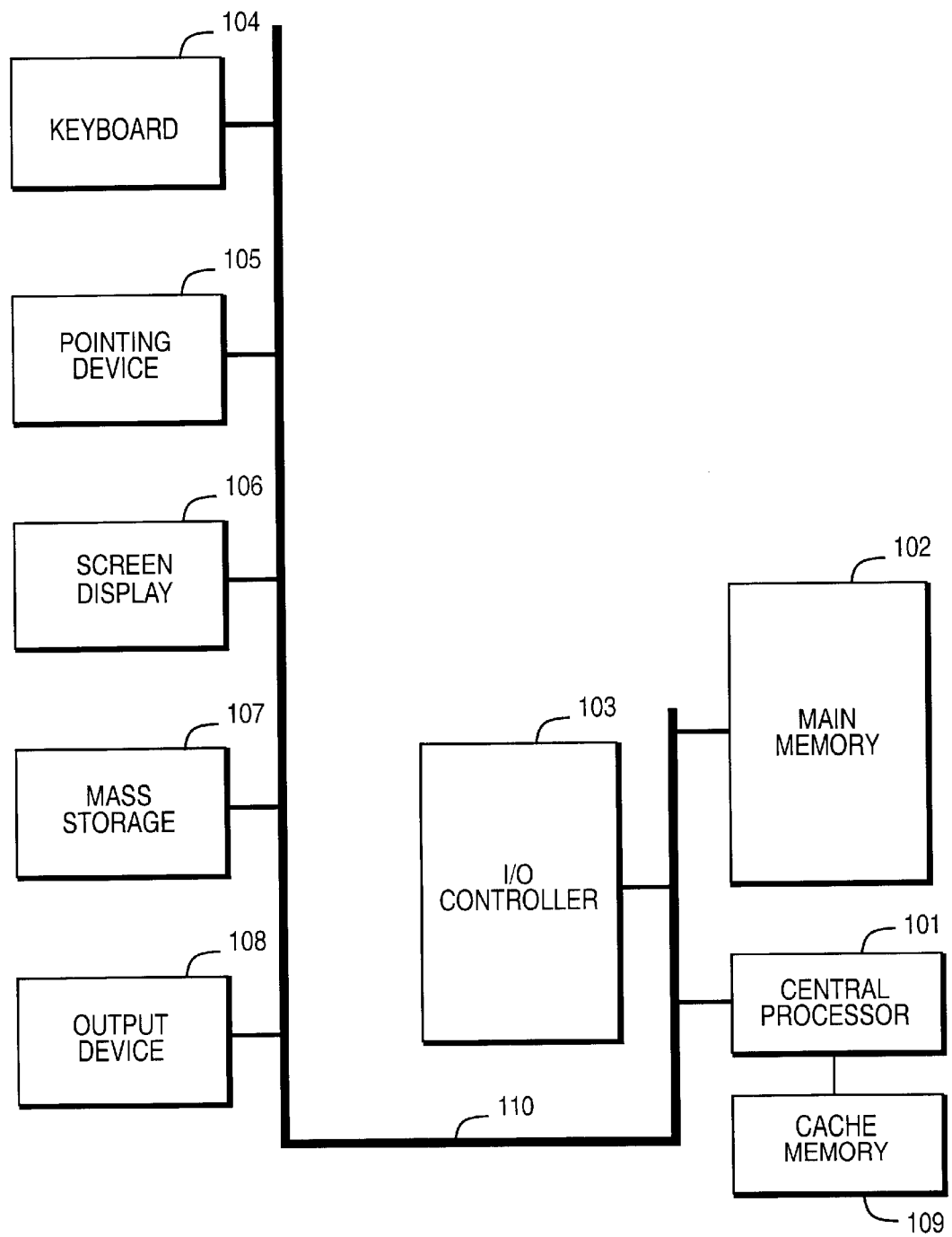
FIG. 1A is a block diagram of a computer system in which the present invention may be embodied.

The invention may be embodied on a computer system such as the system 100 of FIG. 1A, which comprises a central processor 101, a main memory 102, an input/output controller 103, a keyboard 104, a pointing device 105 (e.g., mouse, track ball, pen device, or the like), a screen display device 106, and a mass storage 107 (e.g., hard or fixed disk, removable disk, optical disk, magneto-optical disk, or flash memory). Processor 101 includes or is coupled to a cache memory 109 for storing frequently accessed information; memory 109 may be an on-chip cache or external cache (as shown). Additional output device(s) 108, such as a printing device, may be included in the system 100 as desired. As shown, the various components of the system 100 communicate through a system bus 110 or similar architecture. In a preferred embodiment, the system 100 includes an IBM-compatible personal computer system, available from a variety of vendors (including IBM of Armonk, New York).

Standalone System Software

Figure 1B:
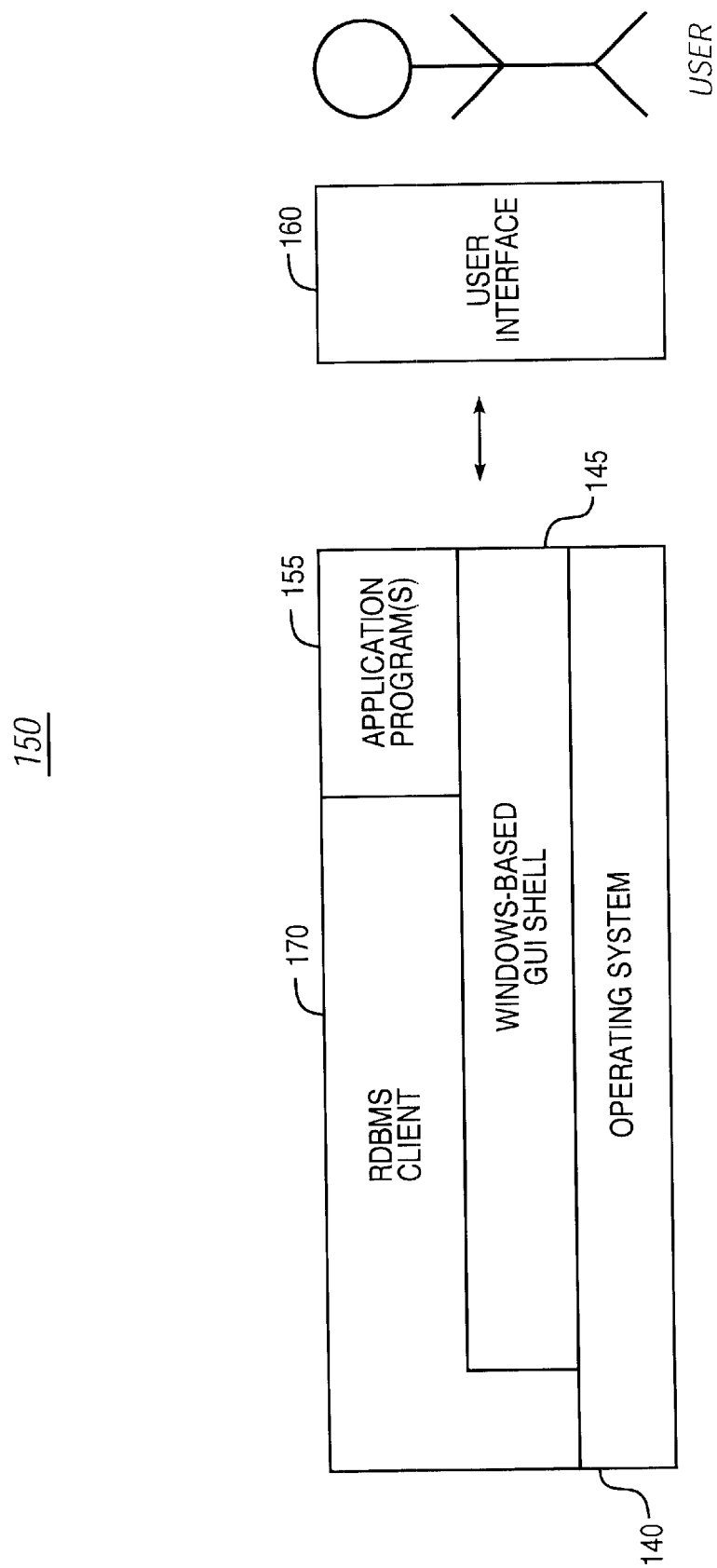
FIG. 1B is a block diagram of a software system for controlling operation of the computer system of FIG. 1A.

Illustrated in FIG. 1B, a computer software system 150 is provided for directing the operation of the computer system 100. Software system 150, which is stored in system memory 102 and on mass storage or disk memory 107, includes a kernel or operating system (OS) 140 and a windows-based GUI (graphical user interface) shell 145. One or more application programs, such as application software programs 155, may be "loaded" (i.e., transferred from storage 107 into memory 102) for execution by the system 100. The system also includes a user interface 160 for receiving user commands and data as input and displaying result data as output.

Also shown, the software system 150 includes a Relational Database Management System (RDBMS) front-end or "client" 170. The RDBMS client 170 may be any one of a number of database front-ends, including PowerBuilder™, Sybase PowerJ™, PowerC++™, Borland Paradox®, Microsoft® Access, or the like, and the front-end may include SQL access drivers (e.g., Sybase JConnect™ JDBC driver or the like) for accessing database tables from an SQL database server operating in a Client/Server environment.

Client/Server Database Management System

Figure 2:
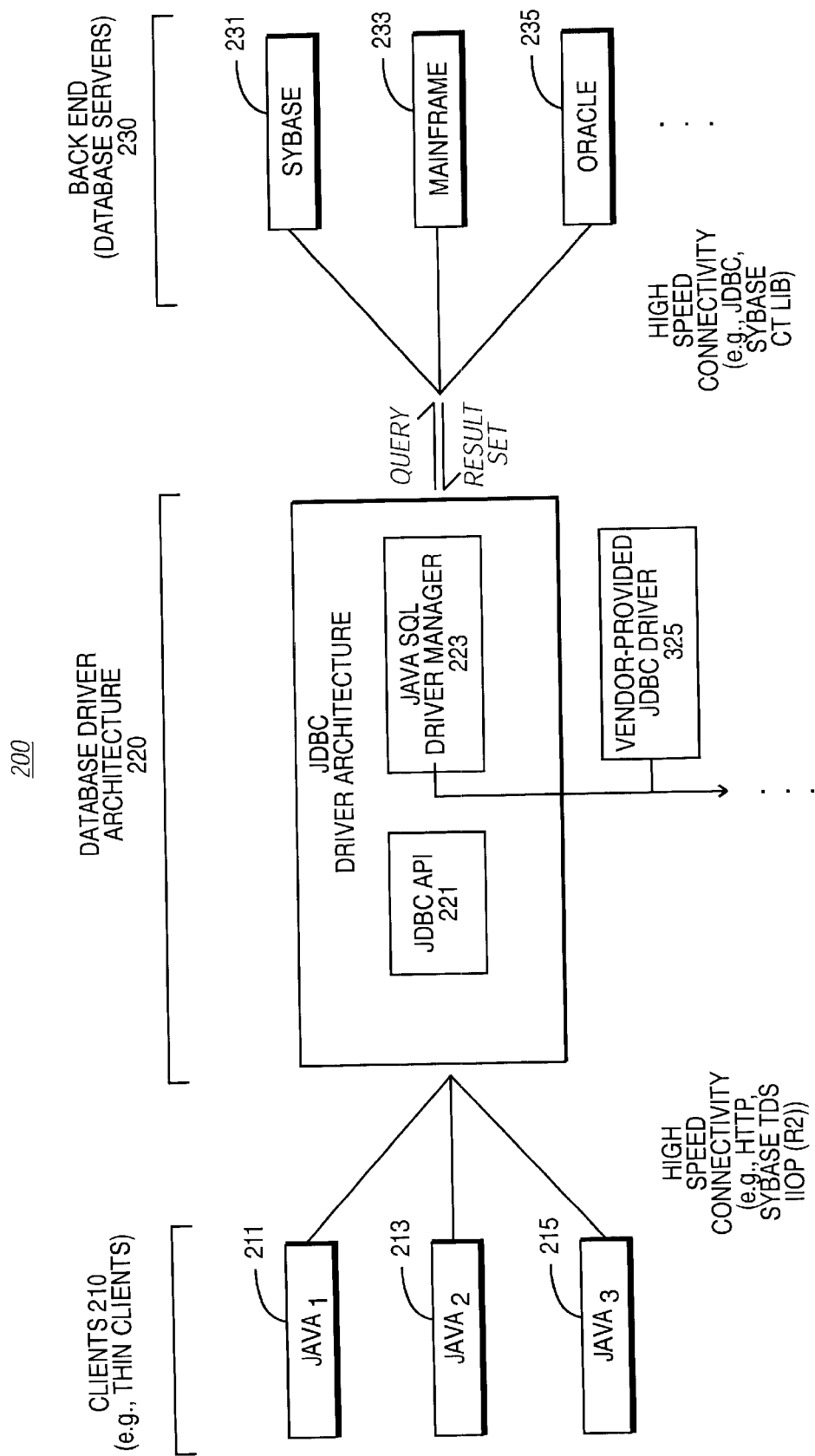
FIG. 2 is a block diagram of a distributed computer environment (which includes the computer system of FIG. 1A) in which the present invention is preferably embodied.

While methods of the present invention may operate within a single (standalone) computer (e.g., system 100 of FIG. 1A), the present invention is preferably embodied in a distributed computer environment, such as illustrated in FIG. 2. Distributed computing environment 200 includes JDBC-enabled client application(s) 210 (e.g., clients 211, 213, 215), connect to a back-end database server(s) 230 (e.g., servers 231, 233, 235) via a Database Driver architecture 220. Database Driver architecture 220 itself includes a Java SQL driver interface 221 and manager 223 (e.g., the Java SQL driver manager provided by Sun Microsystems), for managing one or more JDBC drivers, such as JDBC driver 325 (i.e., Sybase JConnect™ JDBC driver provided by Sybase, Inc.). In an exemplary embodiment, the Clients may themselves include thin-client applications (e.g., Java programs) running on standalone workstations, dumb terminals, or personal computers (PCs), such as the above-described system 100. Typically, such units would operate under a client operating system, such as Microsoft Windows 9x for PC clients. Each Back End Server, such as Sybase® SQL Server™, now Sybase® Adaptive Server™ (available from Sybase, Inc. of Emeryville, Calif.) in an exemplary embodiment, generally operates as an independent process (i.e., independently of the Clients), running under a server operating system such as Microsoft Windows NT (Microsoft Corp. of Redmond, Wash.), NetWare (Novell of Provo, Utah), UNIX (Novell), or OS/2 (IBM). Here, the components of the system communicate over a network which may be any one of a number of conventional network systems, including a Local Area Network (LAN) or Wide Area Network (WAN), as is known in the art (e.g., using Ethernet, IBM Token Ring, or the like). The network includes functionality for packaging client calls in the well-known SQL (Structured Query Language) together with any parameter information into a format (of one or more packets) suitable for transmission across a cable or wire, for delivery to the database servers.

Client/server environments, database servers, and networks are well documented in the technical, trade, and patent literature. For a discussion of database servers and client/server environments generally, and SQL Server™ particularly, see, e.g., Nath, A., *The Guide to SQL Server*, Second Edition, Addison-Wesley Publishing Company, 1995. Additional documentation of SQL Server™ is available from Sybase, Inc. as *SQL Server Documentation Set* (Catalog No. 49600). The disclosures of each of the foregoing are hereby incorporated by reference.

Improved serialization of Java objects

A. Introduction

It is known in the art to employ a communication protocol for effecting communication between database components, such as between a client front end and a database server back end. Typically, such communication protocols include native support for traditional SQL (e.g., ANSI SQL-92) data types, such as character (char), variable-length character (vchar), binary (blob), date-time, time stamp, together with some support for vendor-specific data types.

One example is Sybase® "Tabular Data Stream" which provides a communication protocol for effecting communication between Sybase-branded database products. Tabular Data Stream (TDS) is an application-level protocol used to send requests and responses between clients and servers. A client's request may contain multiple commands. The response from the server may return one or many result sets. TDS relies on a connection-oriented transport service. Session, presentation, and application service elements are provided by TDS. Since TDS does not require any specific transport provider, it can be implemented over multiple transport protocols if they provide connection-oriented service. TDS provides support for login capability negotiation, authentication services, and support for both database specific and generic client commands. Responses to client commands are returned using a self-describing, table-oriented protocol. Column name and data type information is returned to the client before the actual data is returned.

The TDS protocol is mostly a token-based protocol where the contents of a Protocol Data Unit (PDU) are tokenized. The token and its data stream describe a particular command or part of a result set returned to a client. For example, there is a token called TDS_LANGUAGE which is used by a client to send language, typically SQL, commands to a server. There is also a token called TDS_ROWFMT which describes the column name, status, and data type which is used by a server to return column format information to a client. The TDS protocol is half-duplex. A client writes a complete request and then reads a complete response from the server. Requests and responses cannot be intermixed and multiple requests cannot be outstanding.

A TDS request or response may span multiple PDUs. The size of the PDU sent over the transport connection is negotiated at dialog establishment time. Each PDU contains a header, which is usually followed by data. A PDU header contains information about the size and contents of the PDU as well as an indication if it is the last PDU in a request or response.

As an illustration of this protocol, consider, for example, the SQL statement: "select name from sysobjects where id<3". The following will illustrate a high-level description of the TDS tokens exchanged by a client and a server to establish a dialog and then execute a simple SQL query. The query causes two table rows to be returned to the client. The client first requests a transport connection to the server and then sends a login record to establish a dialog. The login record contains capability and authentication information.

| Client | Server |
|---|---|
| login packet → | |
| | ← TDS_LOGINACK |
| | ← TDS_DONE |

Now that a dialog has been established between the client and the server, the client sends the SQL query to the server and then waits for the server to respond.

| Client | Server |
|---|---|
| LANGUAGE: "select name..." → | |

The server executes the query and returns the results to the client. First the data columns are described by the server, followed by the actual row data. A completion token follows the row data indicating that all row data associated with the query has been returned to the client.

| Client | Server |
|---|---|
| | ← TDS_ROWFMT row description |
| | ← TDS_ROW row data |
| | ← TDS_ROW row data |
| | ← TDS_DONE |

Although the above-described communication protocol is employed in the preferred embodiment, the present invention may be implemented using any comparable data streaming protocol. Regardless of the communication protocol employed, the protocol is extended in accordance with the present invention to support object-based data types, such as Java objects, thus allowing these objects to become full class SQL objects.

B. Support for Storing Java Objects as Column Data in a Table

1. General

SQL databases may be modified to directly store Java objects as column data in a database. In this manner, the user is able to create queries (e.g., in SQL) that has predicates that refer to individual objects, including their individual fields and methods, in an extended form of SQL. In a database, Java classes are treated as data types, and a column can be declared with a Java class as its data type. The corresponding JDBC access driver supports storing Java objects in a database by implementing setObject( ) methods and getObject( ) methods. This makes it possible to use the JDBC driver with an application that uses native JDBC classes and methods to directly store and retrieve Java objects as column data. The following describes the requirements and procedures for storing objects in a table and retrieving them using the JDBC driver in the system of the present invention.

2. Prerequisites for Storing Java Objects As Column Data

In order to store Java objects belonging to a user-defined Java class in a column, the following requirements should be met. First, the class should implement the java.io.Serializable interface. This is because the JDBC driver in a preferred embodiment employs the native Java serialization and deserialization to send objects to a database and receive them back from the database. Second, the class definition should be installed in the destination database. Finally, the client system should have the class definition in a class file that is accessible through the local CLASSPATH environment variable.

3. Sending a Java Object to a Database

To send an instance of a user-defined class as column data, one employs one of the following setObject( ) methods, as specified in the PreparedStatement interface:

void setObject(int parameterIndex, Object x, int targetSqlType, int scale) throws SQLException;
void setObject(int parameterIndex, Object x, int targetSqlType) throws SQLException;
void setObject(int parameterIndex, Object x) throws SQLException;

The following example defines an Address class, shows the definition of a "Friends" table that has an Address column whose data type is the Address class, and inserts a row into the table.

```
public class Address implements Serializable
{
public String streetNumber;
public String street;
public String apartmentNumber;
public String city;
public int zipCode;
//Methods
...
}
Friends table:
varchar (30) firstname,
varchar (30) lastname,
Address address,
varchar (15) phone)
// Connect to the database containing the Friends table.
Connection conn =
    DriverManager.getConnection("jdbc:sybase:Tds:localhost:5000",
    "username", "password");
// Create a Prepared Statement object with an insert statement
//for updating the Friends table.
```

-continued

```
PreparedStatement ps = conn.prepareStatement("INSERT INTO Friends
    values (?,?,?,?)");
// Now, set the values in the prepared statement object, ps.
// set firstname to "Joan."
ps.setString(1, "Joan");
// Set last name to "Smith."
ps.setString(2, "Smith");
// Assuming that we already have "Joan_address" as an instance
// of Address, use setObject(int parameterIndex, Object x, int //
targetSqlType) to set the address column to "Joan_address."
// Note that the targetSqlType is java.sgl.types.JAVA_OBJECT, with a //
designated integer value of "2000."
ps.setObject(3, Joan_address, 2000);
// Set the phone column to Joan's phone number.
ps.setString(4, "123-456-7890");
// Perform the insert.
ps.executeupdate( );
```

4. Receiving a Java Object from the Database

A client JDBC application can receive a Java object from the database in a result set or as the value of an output parameter returned from a stored procedure. If a result set contains a Java object as column data, one may employ the following getobject( ) methods in the ResultSet interface to assign the object to a class variable.

Object getObject(int columnIndex) throws SQLException;
Object getObject(String columnName) throws SQLException;

If an output parameter from a stored procedure contains a Java object, one may employ the following getObject( ) method in the CallableStatement interface to assign the object to a class variable.

Object getObject(int parameterIndex) throws SQLException;

The following example illustrates the use of ResultSet.getObject(int columnIndex) to assign an object received in a result set to a class variable. The example uses the Address class and Friends table of the previous section and presents a simple application that prints a name and address on an envelope.

```
/*
** This application takes a first and last name, gets the
** specified person's address from the Friends table in the
** database, and addresses an envelope using the name and
** retrieved address.
*/
public class Envelope
{
Connection conn = null;
String firstName = null;
String lastName = null;
String street = null;
String city = null;
String zip = null;
public static void main(String[ ] args)
{
if (args.length <2)
{
    System.out.println ("Usage: Envelope <firstName>
        <lastName>");<lastName>");
    System.exit(1);
}
// create a 4" x 10" envelope
Envelope e = new Envelope(4, 10);
try
{
    // connect to the database with the Friends table.
    conn = DriverManager.getConnection(
```

-continued

```
    "jdbc:sybase:Tds:localhost:5000", "username",
        "password");
    // look up the address of the specified person
    firstName = args[0];
    lastName = args[1];
    PreparedStatement ps = conn.prepareStatement(
        "SELECT address FROM friends WHERE " +
    "firstname = ? AND lastname = ?");
    ps.setString(1, firstName);
    ps.setString(2, lastName);
    ResultSet rs = ps.executeQuery( );
    if (rs.next( ))
    {
        Address a = (Address) rs.getObject(1);
        // set the destination address on the envelope
        e.setAddress(firstName, lastName, a);
    }
    conn.close( );
}
catch (SQLException sqe)
{
    sqe.printStackTrace( );
    System.exit(2);
}
// if everything was successful, print the envelope
e.print( );
}
private void setAddress(String fname, String lname, Address a)
{
    street = a.streetNumber + " " + a.street + " " +
        a.apartmentNumber;
    city = a.city;
    zip = " " + a.zipCode;
}
private void print( )
{
    // Print the name and address on the envelope.
    . . .
}
}
```

C. Class Descriptor-based Serialization

1. Class ID Serialization

As described above, the inclusion of the detailed class description in the object serialization makes those serializations portable, and versionable at the expense of the sometimes considerable size required to represent the descriptions. A time penalty also results, from the time taken to write the description.

In accordance with the present invention, a class identifier approach is introduced for supporting object serialization. A Class ID (referred hereafter as ACI) serialization is provided as a protocol for converting between a java object and a binary representation. Like Sun serialization, it operates to provide object serialization. Unlike Sun serialization, however, the class description required in ACI is dramatically less.

ACI is intended for an environment in which all classes ever involved in any serialization are known by the environment (as is often the case). Each class known to the environment is represented by a compact numeric identifier, and it is this identifier alone that is used to represent the class description in the serialization. A table of the class identifiers is kept at the beginning of each serialization. ACI is much smaller but, without further enhancement, the approach would be at the expense of portability. In accordance with the present invention, however, a simple transformation is applied so that any ACI serialization can be converted to a portable serialization.

2. Class Descriptor Serialization

Class Descriptor serialization (ACD) is identical to ACI except that the class identifier table beginning ACI is replaced by a table of class descriptors. These class descriptors contain virtually the same information as Sun class descriptors, so an ACD serialization has the same portability characteristics as Sun serialization. To convert between ACI and ACD serializations is a very simple and computationally frugal process. Because both are otherwise identical (apart from the class identifier tables), only the class table contents need change. The environment maintains a correspondence between the ACI class identifiers and ACD class descriptors.

3. Grammar of Serialization

Rules are provided for object serial representation as shows below, using (typical) grammar notation.

Rule 1: [X] indicates that X is optional
Rule 2: [X . . . ] indicates 0 or more occurrences of X
Rule 3: X [. . . ] indicates 1 or more occurrences of X
Rule 4: X |Y indicates X or Y must occur
Rule 5: 0x is used to precede a hexadecimal literal value
Rule 6: (datatype) indicates the java type of the following token
Rule 7: 'C' indicates an ASCII character literal
Rule 8: (utf8) indicates a UTF8 string encoding Using the above notation, the following object serialization fields are defined.

```
object-serialization: object-serial-type classdesc-table object-table
serial-type: serial-type-classid-header | serial-type-classdesc-header
serial-type-classid-header: (byte) 0x20
serial-type-classdesc-header: (byte) 0xC0
classdesc-table:   classid [...] null-classid
                 | classdesc [...] null-classdesc
classid: compact-int
null-classid: (byte) 0x0
object-table: object [...] null-object
null-object: null-classid
object: class-object | simple-object | array-object
class-object: proxy-classid proxy-classid
simple-object: object-piece [...]
object-piece: proxy-classid object-piece-data
object-piece-data: field-data [...]
field-data:   primitive-field-data
            | object-proxyid
primitive-field-data:   boolean-field-data
                      | char-field-data
                      | byte-field-data
                      | short-field-data
                      | int-field-data
                      | float-field-data
                      | long-field-data
                      | double-field-data
boolean-field-data: (boolean)
char-field-data: (char)
byte-field-data: (byte)
short-field-data: (short)
int-field-data: (int)
float-field-data: (float)
long-field-data: (long)
double-field-data: (double)
array-object:   primitive-array-object
              | object-array-object
primitive-array-object: primitive-type array-size primitive-array-data
primitive-type:   (byte) 0x5   // boolean
                | (byte) 0x6   // char
                | (byte) 0x7   // float
                | (byte) 0x8   // double
                | (byte) 0x9   // byte
                | (byte) 0xA   // short
                | (byte) 0xB   // int
                | (byte) 0xC   // long
array-size: compact-int
primitive-array-data:   boolean-array-data
                      | char-array-data
                      | byte-array-data
                      | short-array-data
                      | int-array-data
                      | float-array-data
                      | long-array-data
                      | double-array-data
boolean-array-data: boolean-field-data [...]
char-array-data: char-field-data [...]
byte-array-data: byte-field-data [...]
short-array-data: short-field-data [...]
int-array-data: int-field-data [...]
float-array-data: float-field-data [...]
long-array-data: long-field-data [...]
double-array-data: double-field-data [...]
object-array-object: object-type object-array-class_signature array-size
object-array-data
object-type: (byte) 0x1
object-array-class_signature:   '[' [...] { primitive-signature
                               | 'L' proxy-classid } '[0]'
primitive-signature:   'Z' // boolean
                     | 'C' // char
                     | 'F' // float
                     | 'D' // double
                     | 'B' // byte
                     | 'S' // short
                     | 'I' // int
                     | 'J' // long
object-array-data: object-proxyid [...]
classdesc:   classdesc-serial-type class-name class-flags
             total-class-members data-member [...]
class-name: (utf8)
member-name: (utf8)
data-member: member-name { primitive-data-member | object-
data-member }
primitive-data-member: primitive-type
object-data-member: object-type object-class-name
classdesc-serial-type: 0x80
null-classdesc: classdesc-serial-type '/0'
```

The compact-int rule is used to indicate a format for storing numbers efficiently. As will be explained, proxy-classid and object-classid will, in general, correspond to relatively small numbers; however, there is no limit to how much they can grow. Using a fixed size (e.g., four bytes) for storing these identifiers would entail wasted space for the normally small identifiers. Using a smaller size (e.g., two bytes), on the other hand, would impose constraints on the maximum size of a serialized object. Instead, all identifiers are stored as compact numbers. In a compact-int, each byte in the quantity uses seven bits to represent the number, with the other bit set when there exists a following byte. A method is defined in the following pseudo-code.

```
while( N > 0 ) {
    if( (N & ~0x7F) != 0 ) {
        WriteByte( (N& 0x7f) | 0x80 )
    } else {
        WriteByte( N & 0x7F )
    }
    N = N >> 7;
}
```

Now, to understand a method for improved object serialization, assume the following notation. Let O be the object being serialized. Let R(O) be the set of all objects reachable from O. Let C(O) be the set containing the class and superclasses of O. If O is in fact a class object, then C(O) contains O, as well. Let C(R(O))={C(o) for each o in R(O)}. Let clid(C) be the class id of class C. Let proxy(C) be the proxy id of class C. The proxy id of a class is its ordinal position within the class table plus 0x10. The addition of 0x10 is to allow distinguishing from the primitive-array-types. Let proxy(O) be the proxy id of object O. The proxy id of an object is its ordinal position within the object table.

An improved method of object serialization may be summarized by the following method steps, as illustrated in FIGS. 3A–E. At the outset, at step 301, a byte representing the type of serialization is written, serial-type-classid-header. Next, at step 302, the classid-table is written using the following logic: for each class C in C(R(O)), the classid of C, clid(C) is written. For each C, a proxy(C) is generated, whose value is the position in the classid table, starting at position 1. The classid table is terminated by a null classid, 0.

Now, for each object o in R(O), the object may be streamed out as follows. As shown at step 303, the method switches (i.e., branches) based on object type. If o is a primitive array, the method branches to step 311, to apply the following substeps (substeps 311*a–c*, shown in FIG. 3B).

(a) Write primitive array type;

(b) Write the size of the array; and (c) For each primitive element of o, write the element beginning with the 0th element.

Figure 3A:
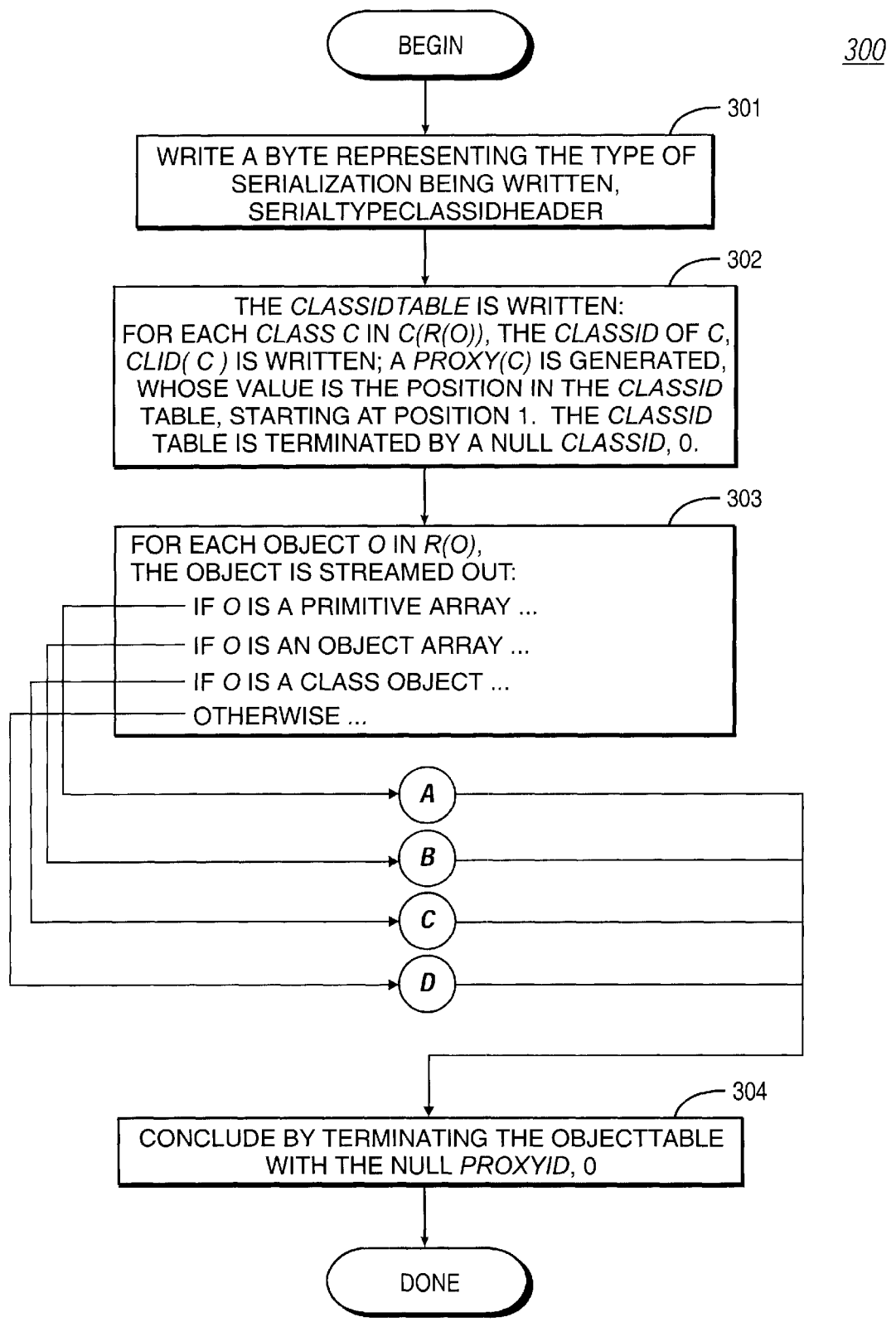
FIGS. 3A–E present flowchart illustrating an object serialization method of the present invention.
Figure 3B:
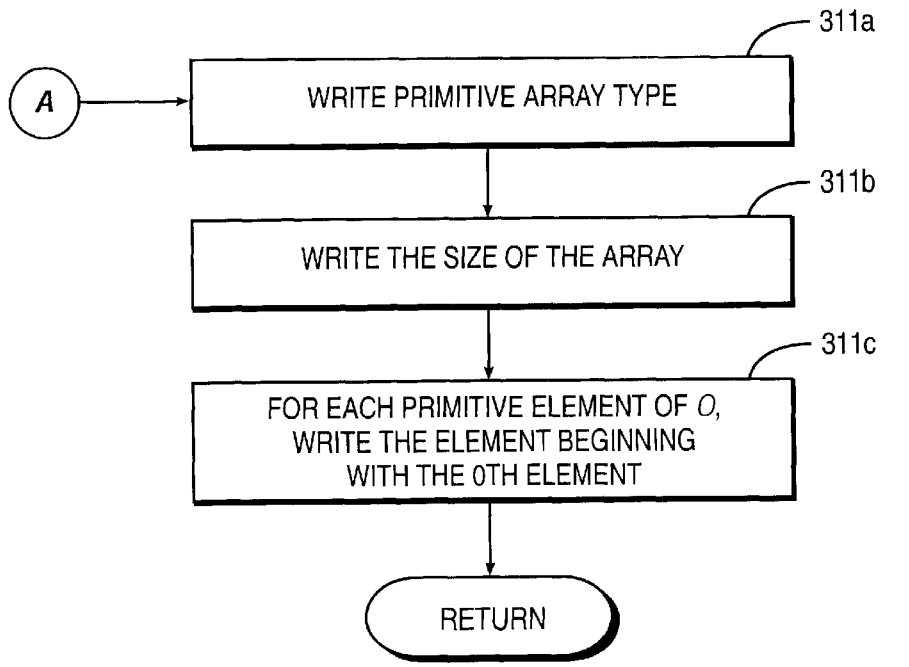
Figure 3C:
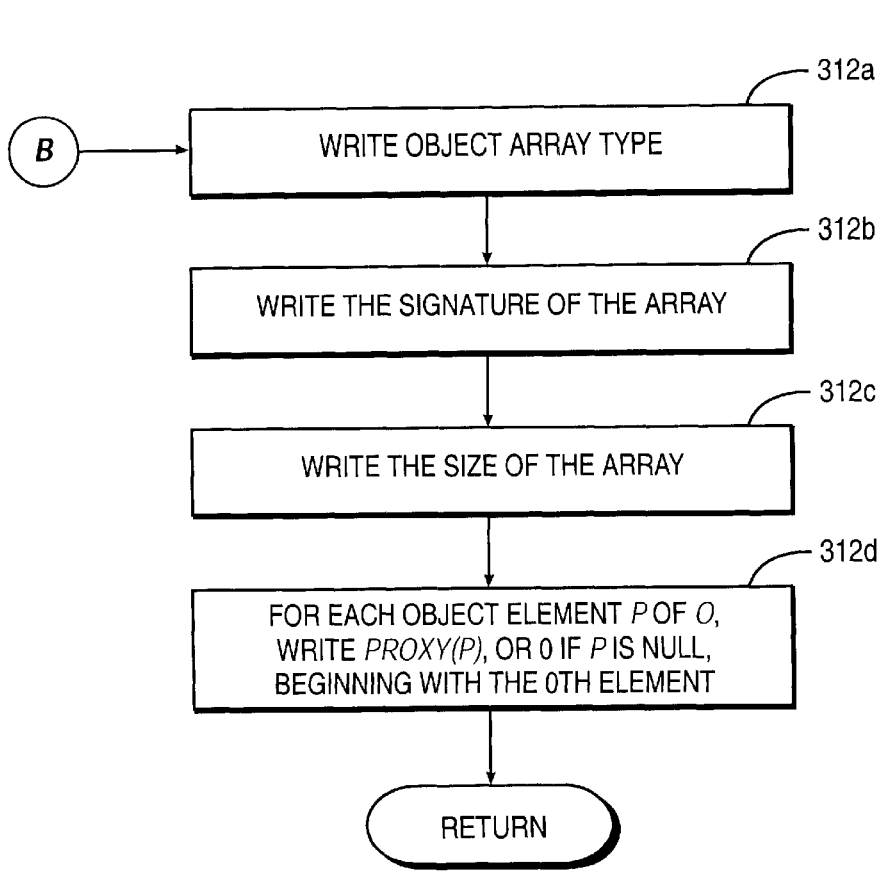

If, on the other hand, o is an object array, the method branches to step 312, to apply the following substeps (substeps 312*a–d*, shown in FIG. 3C).

(a) Write object array type;

(b) Write the signature of the array;

(c) Write the size of the array; and (d) For each object element p of o, write proxy(p), or 0 if p is null, beginning with the 0th element.

Figure 3D:
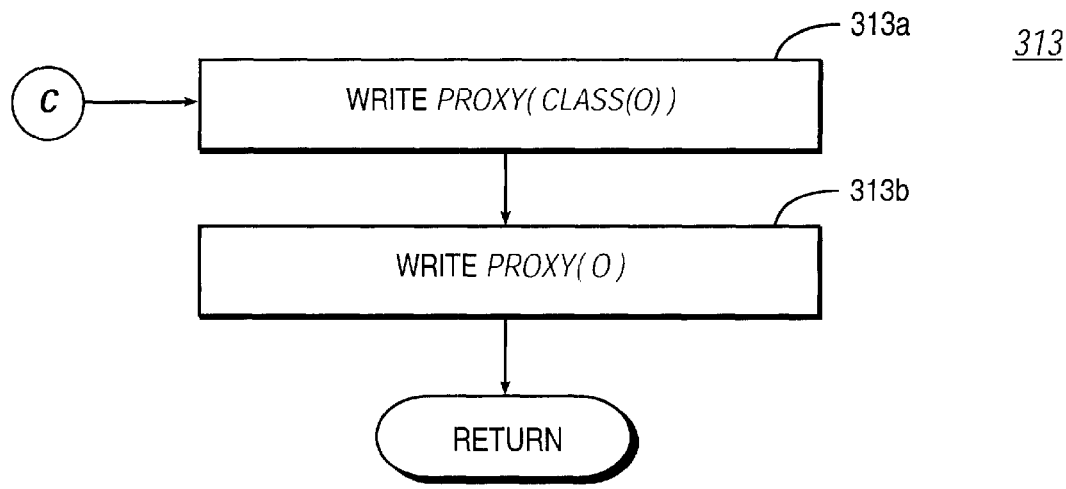

If o is a class object, the method branches to step 313, to apply the following substeps (substeps 313*a–b*, shown in FIG. 3D).

(a) Write proxy( class(o)); and (b) Write proxy(o).

Figure 3E:
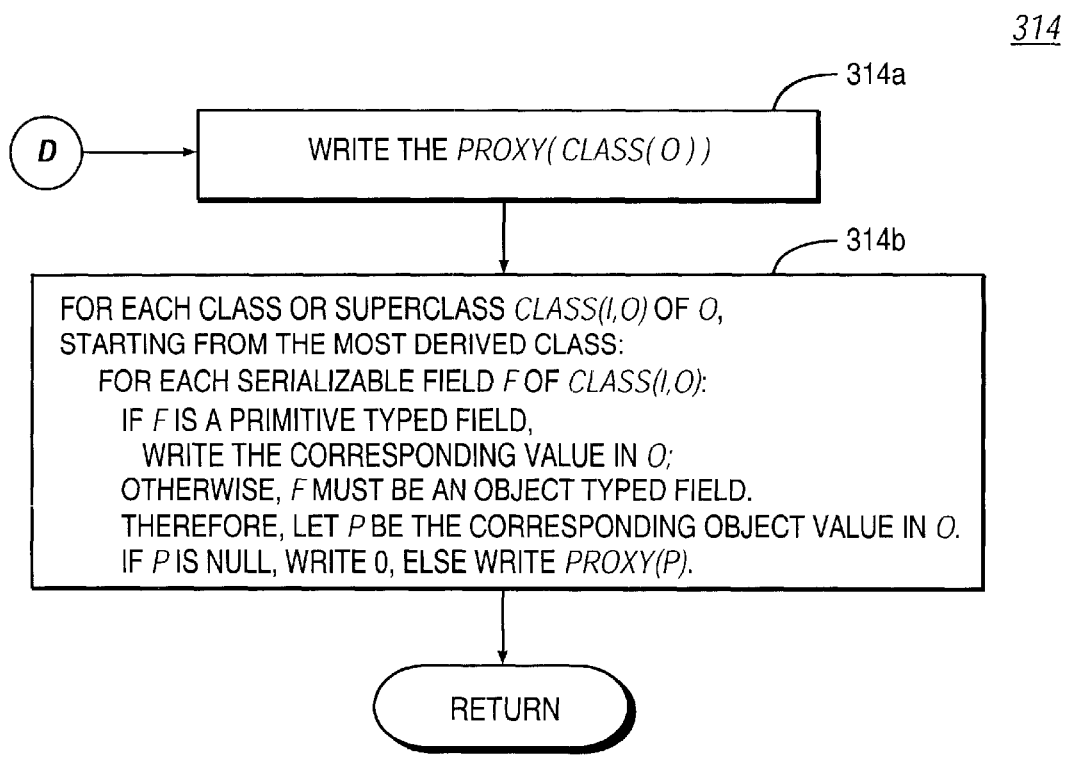

Otherwise, the method branches to step 314, to apply the following substeps (substeps 314*a–b*, shown in FIG. 3E).

(a) Write the proxy( class(o));

(b) For each class or superclass class(i,o) of o, starting from the most derived class:

For each serializable fieldf of class(i,o):

If f is a primitive typed field, write the corresponding value in o;

Otherwise, f must be an object typed field. Therefore, let p be the corresponding object value in o. If p is null, write 0, else write proxy(p).

The method concludes by terminating the object-table with the null proxyid, 0, as shown by step 304 (FIG. 3A).

D. Practical use and test results

The SQL employed in a DBMS may be extended to allow the installation of Java classes into a database. For instance, the database engine Sybase Adaptive SQL Anywhere (ASA) includes a Java VM, thus allowing Java to be invoked from SQL and run in the context of the database engine. In addition, database table columns can be created with type corresponding to Java types, allowing the storage of Java objects in the database. Database data is generally saved in persistent stores, so ASA may store its Java objects in the database using a serialization of the object.

A compact serialization for storing Java objects was preferred. Database data is generally kept as compact as possible within reason. Clearly, the amount of compaction must be weighed against the time required to do the compacting. Compact data leads to less space required to store the data, and less I/O time required to read and write the data. The absence of class descriptor information makes ACI a much more compact serialization than Sun. Within the database environment, all classes ever installed into the database are known, so the class identifiers needed by ACI can be and are maintained within the database.

Consider, for instance, the following simple class.

```
public class MyClass implements java.io.Serializable {
    int    field1;
    int    field2;
    public MyClass( int f1, int f2 ) {
        field1 = f1;
        field2 = f2;
    }
}
```

An instance of MyClass serialized using Sun serialization requires 54 bytes. The same instance serialized via ACI is 16 bytes, and by ACD is 36 bytes. These results are summarized by the following Table 1.

TABLE 1

TEST RESULTS

| Serialization methodology | Size |
| --- | --- |
| Sun serialization | 54 bytes |
| ACI serialization | 16 bytes |
| ACD serialization | 36 bytes |

E. Portability

Although ACI is very efficient to use for storing Java objects within a closed environment like a database, there are cases where an object leaves the confines of the database, and hence there is a necessity for a portable format. The best example of the need for such a portable format is database replication. In replication it is necessary to transfer data from one database to another. Since class identifiers are unique only to a particular database, class identifiers in one database will likely not correspond to the same classes in another database. The ACD serialization provides the necessary class description to allow portability.

The problem of replication has some other interesting characteristics. Replication is concerned with syncing database data across multiple databases, so replication most often just replicates database changes. These changes are most efficiently drawn from the database log file. In fact, replication does not even need to communicate with the database engine. Replication needs to only understand the log file.

In the system of the present invention, the system's log file stores Java object serializations in ACI format, but replication requires them in ACD format. This is where the class table beginning ACI and ACD are particularly advantageous. Class descriptors are also stored in the log file, so as a replication process scans a log file, it builds up a list of known class descriptors with their corresponding class identifiers, and replaces the ACI class table with a ACD class table in every Java object serialization. Hence, without even requiring a running Java VM, Java objects can be easily transformed from one format to the other.

While the invention is described in some detail with specific reference to a single preferred embodiment and certain alternatives, there is no intent to limit the invention to that particular embodiment or those specific alternatives. Thus, the true scope of the present invention is not limited to any one of the foregoing exemplary embodiments but is instead defined by the appended claims.

What is claimed is:

1. In a system comprising a computer network having a database server and a client, an improved method for allowing a client to retrieve an object stored in a database table residing on a database server, the method comprising:

providing a streaming protocol for transferring objects from the database server to the client;

receiving from the client a request for serialization of a particular object for transferring the particular object from the database server to the client, wherein said particular object is a Java object comprising at least one class, and wherein said particular object is stored in a relational database table at the database server;

in response to the request, creating a class identifier for uniquely identifying each class from which the particular object is derived that is already known to the system, thereby supporting conversion of the particular object to and from a binary representation without transmitting class descriptor information;

creating a serialization comprising a binary representation of the particular object suitable for streaming transmission, said serialization including a table of said class identifiers for the particular object;

streaming the binary representation of the particular object from the database server to the client; and upon receipt of the streamed binary representation at the client, recreating at the client a copy of said particular object.

2. The method of claim 1, further comprising converting said serialization into a portable serialization by:

creating a class descriptor for each class from which the particular object is derived, for providing detailed class description information in the object serialization for making the serialization portable;

for each class identifier of a given class, specifying a correspondence between the class identifier of the given class and a class descriptor for that class, wherein said class descriptor comprises information for converting the particular object to and from a binary representation when the given class is unknown to the system; and transforming said serialization into a portable serialization by replacing said table of class identifiers with a suitable table of class descriptors.

3. The method of claim 2, wherein said objects comprise Java objects and wherein said portable serialization comprises Java-compatible serialization.

4. The method of claim 2, wherein said table of class identifiers requires substantially less storage than said table of class descriptors.

5. The method of claim 2, wherein the correspondence between a class identifier of a given class and a corresponding class descriptor for that class is maintained by the system.

6. The method of claim 1, wherein each class identifier comprises a numeric identifier.

7. The method of claim 1, wherein each class identifier comprises a compact numeric identifier comprising a quantity of at least one byte value.

8. The method of claim 7, wherein said compact numeric identifier comprises a variable-length numeric identifier wherein each byte of the identifier uses seven bits to represent a number quantity and one bit to indicate whether an additional byte follows for the identifier.

9. The method of claim 1, wherein said objects comprise Java objects derived from Java classes.

10. The method of claim 1, further comprising:

storing said serialization in a database table at the database server.

11. The method of claim 1, wherein said request comprises an SQL query received from the client.

12. The method of claim 1, wherein said Java object includes instantiated Java class data members and class methods.

13. The method of claim 1, wherein said client comprises a database application executing at a client machine.

14. The method of claim 1, wherein said protocol comprises a token-based protocol.

15. The method of claim 1, wherein said particular object comprises a Java object stored as column data in a database table of the database server.

16. The method of claim 1, wherein said serialization includes at its beginning said table of said class identifiers for the particular object.

17. The method of claim 1, wherein said system maintains a table of classes known to the system.

18. The method of claim 17, wherein a class identifier for a given class is created, at least in part, by basing the class identifier on an ordinal position of the given class in said table of classes.

* * * * *